Oct. 13, 1970 W. F. BODTMANN 3,534,278
VARIOLOSSERS HAVING SUBSTANTIALLY FLAT FREQUENCY RESPONSE CHARACTERISTICS AT ALL LOSS SETTINGS
Filed March 3, 1969 3 Sheets-Sheet 1

INVENTOR
W. F. BODTMANN
BY Rey M. Porter Jr.
ATTORNEY

United States Patent Office 3,534,278
Patented Oct. 13, 1970

3,534,278

VARIOLOSSERS HAVING SUBSTANTIALLY FLAT FREQUENCY RESPONSE CHARACTERISTICS AT ALL LOSS SETTINGS

William F. Bodtmann, Middletown, N.J., assignor to Bell Telephone Laboratories, Incorporated, Murray Hill, N.J., a corporation of New York Filed Mar. 3, 1969, Ser. No. 803,719
Int. Cl. H03f 3/04, 3/68
U.S. Cl. 330—21 2 Claims

ABSTRACT OF THE DISCLOSURE

The undercoupled frequency response characteristic often exhibited by variable loss gain control networks operating at and near the maximum loss point is flattened by the formation of a series resonant circuit in the shunt arm. The Q of this circuit is chosen so that its impedance will vary with frequency in the correct way to compensate the undercoupled characteristic. As the value of the shunt resistance increases, the Q of this circuit becomes very small, so that it has a negligible effect on the frequency response characteristic at the minimum loss point. The resulting response characteristic has little distortion as a function of attenuation over a wide frequency band.

BACKGROUND OF THE INVENTION

This invention relates to variable loss transmission networks having a substantially flat frequency response characteristic over a wide frequency band for a large range of loss settings.

Variable loss circuits, sometimes referred to as variolossers, find wide application in connection with gain control of multistage amplifiers. Interstage networks used in these amplifiers are composed of a plurality of tuned circuits, resonant at the same frequency and coupled together by means including a shunt mounted variable resistance element. A common variolosser network includes a double tuned circuit comprising a parallel resonant primary circuit, a series resonant secondary circuit, and a variable resistance element mounted in shunt between the two. An alteration in the value of this shunt mounted resistance varies the loading on the primary circuit and in this manner changes the interstage loss.

Such variolossers are normally designed to have a substantially horizontal frequency response characteristic over the desired band when the resistance of the shunt mounted element is a maximum, i.e., when the interstage loss is smallest. However, as the loss level is increased, by a decrease in the resistance of the shunt mounted element, the loading on the primary resonant circuit increases and the coefficient of coupling is reduced. This causes the two resonant circuits to become undercoupled, and the frequency response characteristic to become rounded. In applications requiring a flat frequency response at all loss levels, this feature must be corrected.

An additional design problem exists in variolossers operating at frequencies in the range of several hundred megahertz. One shunting device commonly used in such applications is the PIN diode, the resistance of which is varied by changes in the D.C. bias current. At lower frequencies, the PIN diode is essentially resistive over a large range of bias currents, but in this higher range it exhibits in addition a significant inductive reactance roughly proportional to bias current. Unless absorbed, this reactance would slope the frequency response characteristic upward across the band.

One way to compensate the undercoupled characteristic is to overdesign the bandwidth of the network so that the rounding effect is not severe over the band actually in use. This solution is inefficient and furthermore is difficult to achieve when the band of interest is already wide. Pat. No. 3,150,326, issued to F. J. Witt, Sept. 22, 1964, discloses a novel means for stabilizing the frequency response characteristic of high frequency variolossers comprising input and output circuits having complementary admittances or impedances as seen from the variable resistance element. That method can overcome the undercoupling problem, but does not deal with the parasitic reactances of the variable resistance element. An improved means for compensating the undercoupled frequency response characteristic and for absorbing the high frequency parasitic reactances of circuit elements in variolossers is therefore desirable.

SUMMARY OF THE INVENTION

The present invention provides a simple and effective means for compensating the undercoupled characteristic which appears at high and intermediate loss levels and for absorbing the parasitic reactances of the shunting resistance which are significant at frequencies of several hundred megahertz. In accordance with the present invention, components are added in series with the PIN diode or other variable resistance element to form a circuit in the shunt arm which is resonant at the center frequency of the operating band. The components' values are chosen so that the impedance of the arm varies with frequency in the correct way to compensate the undercoupled characteristic and to absorb the parasitic reactances of the diode. Furthermore, the Q of this circuit becomes very small as the value of the shunt resistance increases to its maximum so that no significant effect is produced on the frequency response characteristic of the variolosser at low loss levels.

BRIEF DESCRIPTION OF THE DRAWINGS

These and other features and advantages of the invention will be better understood from a consideration of the following detailed description, taken in conjunction with the accompanying drawings, in which.

DETAILED DESCRIPTION

Figure 1:
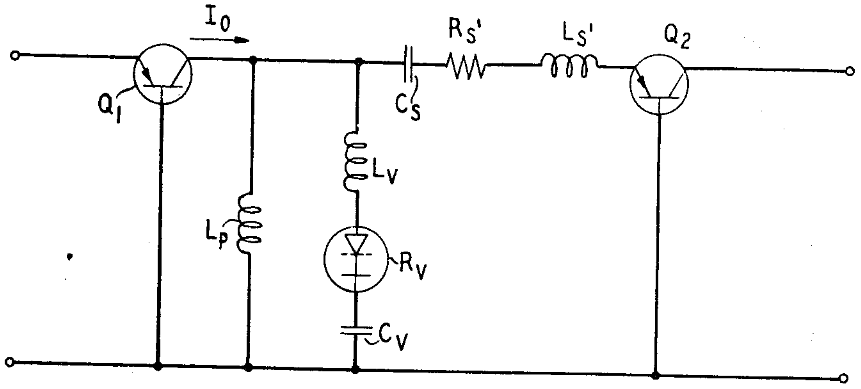
FIG. 1 is a schematic diagram of one embodiment of the present invention.
Figure 2:
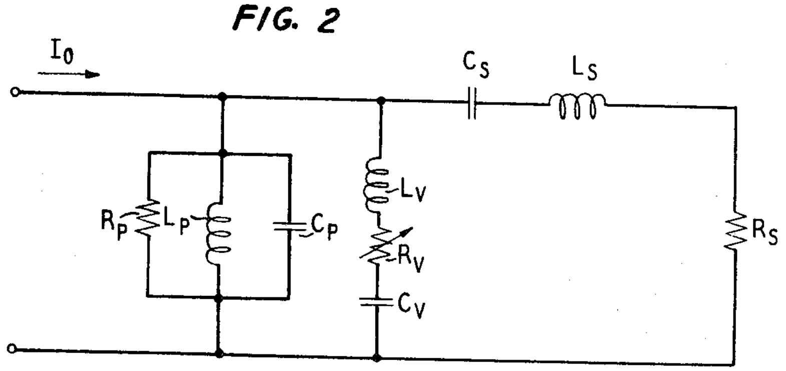
FIG. 2 shows an equivalent circuit representing the embodiment shown in FIG. 1.

Referring to FIG. 1, one embodiment of the present invention is shown schematically in the form of a double tuned interstage network connected between two transistors Q1 and Q2 operating in the common base mode. Bias circuits, standard in the art, are omitted. FIG. 2 shows the equivalent circuit of this embodiment, with transistors Q1 and Q2 replaced by their respective output and input impedances.

The resonant primary circuit in this embodiment comprises inductor $L_P$ in parallel with the output impedance of transistor Q1, represented in FIG. 2 by resistor $R_P$ and capacitor $C_P$. The resonant secondary circuit directly connected to the primary includes capacitor $C_S$, resistor $R_{S'}$ and inductor $L_{S'}$ in series with the input impedance of transistor Q2, which is resistive and inductive. In FIG. 2, inductor $L_S$ is the sum of discrete inductor $L_S$, and the input inductance of transistor Q2, and resistor $R_S$ is the sum of discrete resistor $R_{S'}$, and the input resistance of transistor Q2. Each of these circuits is tuned to resonate at the center frequency of the operating band.

Variable attenuation is provided by the series resonant circuit comprising inductor $L_V$, variable resistor $R_V$ and capacitor $C_V$ connected as shown in an arm in parallel with the secondary series resonant circuit. Variable resistor $R_V$ is illustratively chosen herein to be a PIN diode, the resistance of which is a function of an applied D.C. bias current. As the bias current is varied from zero to a maximum on the order of 1½ milliamps, $R_V$ of a typical PIN diode decreases approximately two orders of magnitude from a maximum value on the order of 500 ohms. A decrease in the value of $R_V$ increases the loading produced by this arm on the primary circuit and increases the interstage loss accordingly.

Figure 3A:
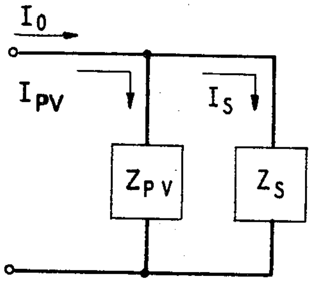
FIGS. 3A and 3B are block representations of prior art and the presently disclosed variolossers.

The formula describing the frequency response characteristic for a variolosser containing only a resistive element in the shunt arm may readily be derived. In the block representation of such a variolosser in FIG. 3A, $Y_{PV}$ is the parallel admittance of the primary resonant circuit and the variable resistance element; $Z_S$ is the impedance of the secondary resonant circuit; and $I_{PV}$ and $I_S$ are the currents flowing through these impedances. In these terms the current transfer function may be written as follows:

$$\frac{I_S}{I_0}=\frac{1}{1+Z_S Y_{PV}} \quad (1)$$

In terms of the individual element impedances, $$Y_{PV}=\frac{R_P+R_V}{R_P R_V}+j\left(\omega C_P-\frac{1}{\omega L_P}\right) \quad (2)$$

$$Z_S=R_S+j\left(\omega L_S-\frac{1}{\omega C_S}\right) \quad (3)$$

If Equations 2 and 3 are substituted into Equation 1 an expression is obtained for frequency response in terms of impedances. This equation, in magnitude form, may be written as follows, where letters D, E, F and G represent groupings of circuit components, D and G being functions of $R_V$, and F being a function of frequency $\omega$:

$$\left|\frac{I_S}{I_0}\right|^2=\frac{1}{[1+G-EF^2]^2+D^2F^2} \quad (4)$$

When boundary requirements including maximum flatness, bandwidth, maximum and minimum loss values (minimum and maximum $R_V$), and a maximally flat characteristic at the minimum loss point are specified, the values of these letters become determinate, absolutely or as a function of $\omega$, and then response characteristics at various loss settings may be computed.

Figure 4A:
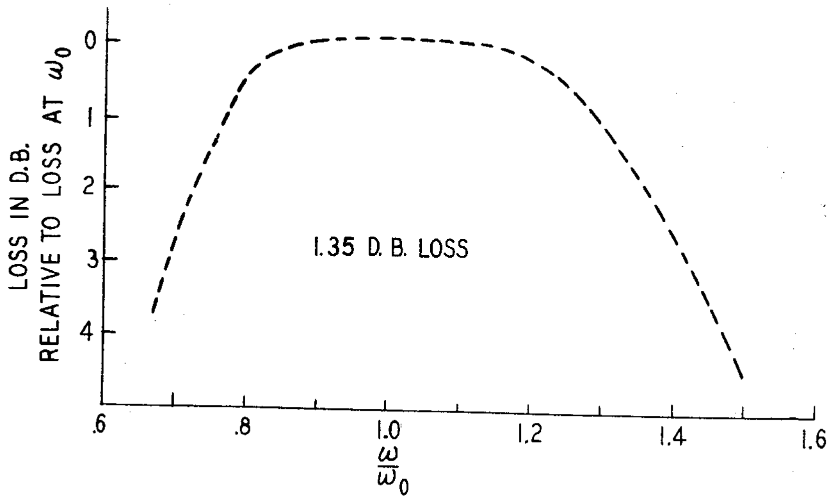
FIGS. 4A, 4B and 4C are graphs comparing the frequency response characteristics at different loss settings of a variolosser operating with and without the teachings of the present invention.
Figure 4B:
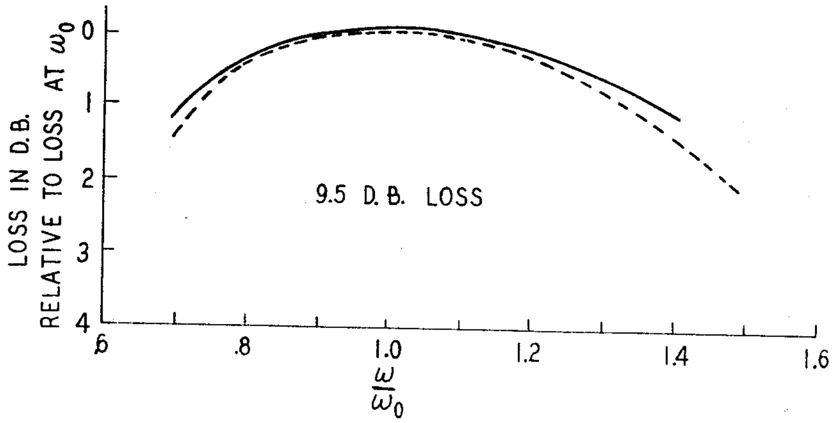
Figure 4C:
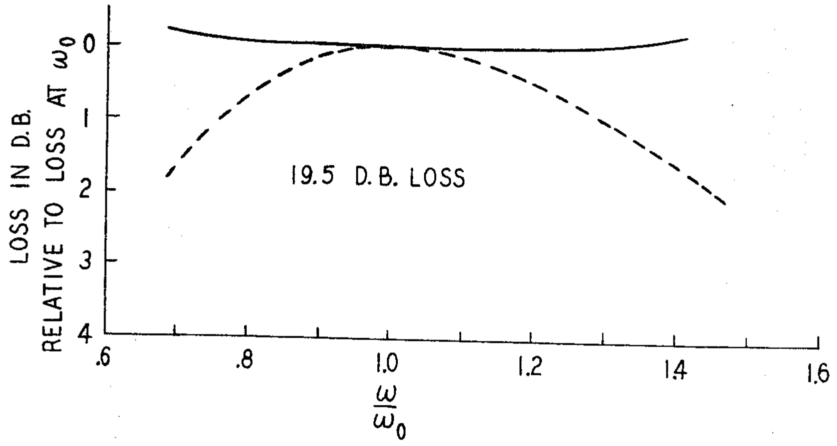
Figure 5A:
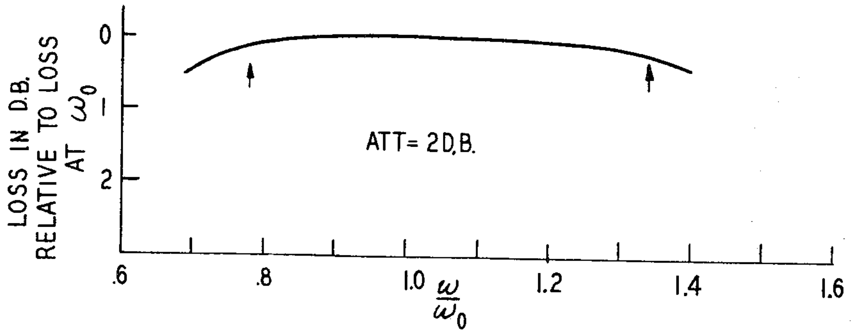
FIGS. 5A, 5B, 5C and 5D are graphs of the frequency response characteristics at different loss settlings of another version of the present invention.
Figure 5B:
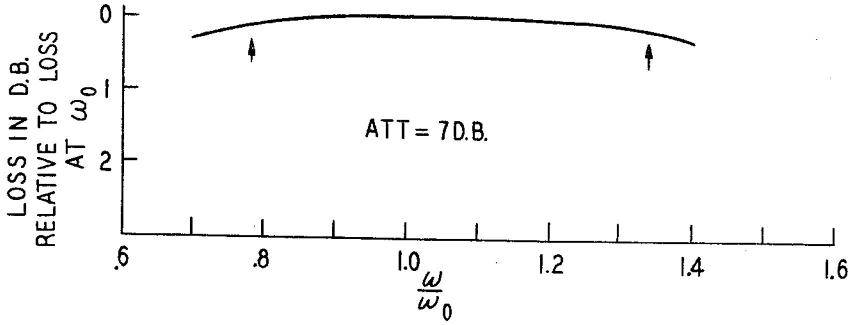
Figure 5C:
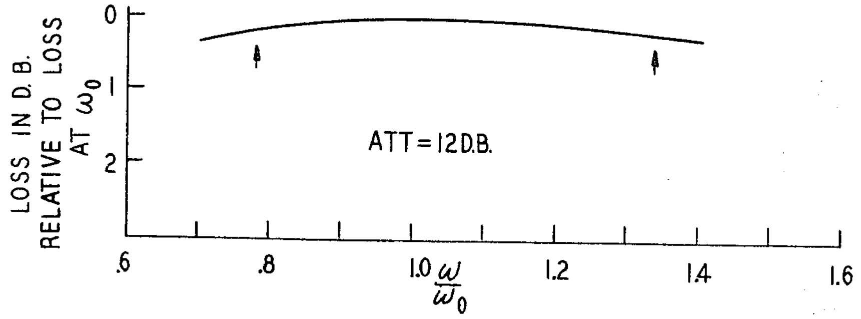
Figure 5D:
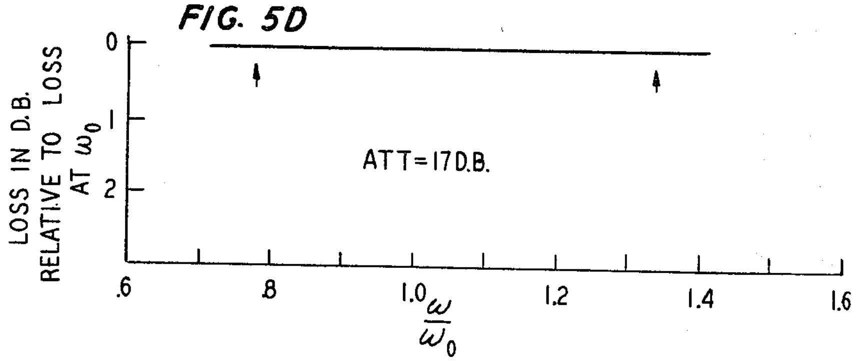

The dotted lines in FIGS. 4A, 4B and 4C present one illustrative set of characteristics, calculated for a PIN diode variolosser operating in the 200 to 400 mHz. band with an attenuation varying from 1.35 db to 20 db. It will be noted that, for a given acceptable variation in amplitude, the usable bandwidth declines markedly at higher loss levels as the undercoupling increases.

Figure 3B:
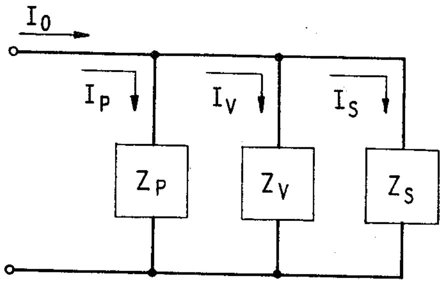

A similar analysis may be made of the characteristics of the improved variolosser. In the block representation in FIG. 3B, $Z_V$ and $Z_S$ represent respectively the impedances of the variable resistance arm and the secondary resonant circuit; $Y_P$, the admittance of the primary resonant circuit. The current transfer function may be written $$\frac{I_S}{I_0}=\frac{Z_V}{(1+Y_P Z_S)Z_V+Z_S} \quad (5)$$

and as before an expression may readily be obtained in terms of individual impedances. Using the same letters to represent the same groupings of impedances, and letting $$Q_V=\frac{1}{\omega_0 C_V R_V}=\frac{\omega_0 L_V}{R_V} \quad (6)$$

Where $\omega_0$ is the resonant frequency, the equation becomes $$\left|\frac{I_S}{I_0}\right|^2=\frac{1+(Q_V F)^2}{[1+G+R_S/R_V-(E+DQ_V)F^2]^2+[(1+G-EF^2)Q_V+R_S Q_S/R_V+D]^2F^2} \quad (7)$$

By plotting Equation 7 at the maximum loss point (minimum $R_V$) and varying $L_V$ and $C_V$, a value for $Q_V$ is found which produces a flat amplitude response over the desired wide band. The solid curve in FIG. 4C illustrates the result obtained in the illustrative example by setting $Q_V$ equal to 0.832. At the center frequency $\omega_0$, the variable resistance arm is resonant, and its impedance $Z_V$ is at a minimum equal to $R_V$. At higher or lower frequencies, however, $L_V$ and $C_V$ do not cancel each other and $Z_V$ increases, thereby decreasing the loading produced by this arm on the primary circuit. If $Q_V$ is properly chosen, the frequency response characteristic of $Z_V$ is concave-upward just enough to compensate the concave-downward characteristic of the uncorrected variolosser.

As the loss is adjusted from maximum to minimum, the value of $R_V$ increases approximately two orders of magnitude, and the value of $Q_V$ decreases similarly. As this occurs, those terms in Equation 7 having $R_V$ in their denominator or $Q_V$ in their numerator become smaller and therefore Equation 7 approaches Equation 4. At and near the minimum loss point, the two are practically identical. This tendency is visible in FIGS. 4A, 4B and 4C, where the solid curves describing the improved variolosser characteristics approach the dotted curves representing the basic variolosser characteristics as the loss is decreased. At the minimum 1.35 db loss setting, the two characteristics are essentially identical, and only one curve is shown.

Different boundary conditions may be chosen to accent features necessary for particular applications. For example, a still wider bandwidth may be achieved if a greater minimum loss and a smaller variation in attenuation are acceptable. FIGS. 5A, 5B, 5C and 5D show the computed characteristics for such an extra-wide band variolosser operating in the same frequency range as the previous example but having a reduced attenuation range (from 2 db to 17 db). $Q_V$ for this circuit is 0.458. The arrows indicate a bandwidth slightly greater than 50 percent, over which amplitude distortion does not exceed 0.1 db for any attenuation level.

In operation the circuitry may be simpler than indicated in FIGS. 1 and 2. When the variable resistance element is a PIN diode, a blocking capacitor is already present in the arm as part of the bias circuit. If its value is chosen with regard to the necessary $Q_V$, no additional capacitor is needed. In addition, inductive reactance is present both in the PIN diode as already indicated and, in distributed form, in the leads. Thus, the present invention may be practiced with few or even no additions to the basic variolosser circuitry through the recognition and proper adjustment of reactances already present.

In cases where a narrower useful band is acceptable, the present invention may be used, in modified form, to achieve a current gain capacity. In this application the discrete inductances in the primary and secondary resonant circuits may be brought together to form an impedance matching transformer. Since the output impedance of a common base transistor is substantially greater than its input impedance, the transformer will produce a current gain when inserted in a common base-common base variolosser, at the cost of reduced bandwidth. The variable resistance arm will function in the same manner as before, to compensate the high loss characteristics, although the equations describing the frequency characteristics will be somewhat different from those derived above. The variolosser will then have a "minimum loss" which is actually a gain, and the gain requirements of associated circuitry may be reduced accordingly.

Another possible variation of the described embodiment is the substitution of a common emitter transistor for the common base version shown as Q1 in FIG. 1. A transistor operating in either configuration will have an output admittance which is capacitive and resistive, so that the above presentation applies equally to both. The main difference between the two configurations is that the output conductance is considerably larger for common emitter operation so that the minimum loss is higher.

Other modifications will readily occur to those skilled in the art which do not depart from the spirit and scope of the present invention.

I claim:

1. A multistage wide band transistor amplifier having a variolosser which operates over a wide frequency band for a large range of loss settings, said variolosser comprising a parallel resonant primary circuit which resonates at the center frequency ($\omega_0$) of the operating band, a series resonant secondary circuit which also resonates at the center frequency ($\omega_0$) of the operating band, said primary and secondary circuits being directly interconnected, and a series resonant circuit connected in shunt with said primary circuit and including in series connection an inductance, a capacitance and a semiconductor diode whose resistance varies inversely in response to an applied bias current, said series resonant shunt circuit also being resonant at the center frequency ($\omega_0$) of the operating band and having a Q at the maximum loss point which substantially compensates for the under-coupled frequency response characteristic that results from a decrease in resistance of said semiconductor diode.

2. A variolosser as defined in claim 1 wherein said semiconductor diode comprises a PIN diode, and said Q is defined by the equation $$Q=\frac{1}{\omega_0 C_V R_V}=\frac{\omega_0 L_V}{R_V}$$

where $L_V$ is the inductance of said series resonant shunt circuit, $C_V$ is the capacitance of the same, and $R_V$ comprises the resistance of the semiconductor diode.

References Cited

UNITED STATES PATENTS

| | | | |
|---|---|---|---|
| 3,150,326 | 9/1964 | Witt | 320—21 |
| 3,358,215 | 12/1967 | Swan | 307—320 X |
| 3,461,394 | 8/1969 | Ulmer | 330—31 X |

ROY LAKE, Primary Examiner

L. J. DAHL, Assistant Examiner

U.S. Cl. X.R.

333—28, 81